(12) United States Patent
Marek et al.

(10) Patent No.: US 6,570,120 B2
(45) Date of Patent: May 27, 2003

(54) APPARATUS FOR RESISTANCE WELDING

(75) Inventors: Udo Marek, Euskirchen (DE); Karl Pöll, Aachen (DE); Ulrich Matuschek, Aachen (DE); Axel Heinemann, Aachen (DE); Norbert Metzen, Herzogenrath (DE)

(73) Assignee: Matuschek Messtechnik GmbH, Alsdorf (DE)

( * ) Notice: Subject to any disclaimer, the term of this patent is extended or adjusted under 35 U.S.C. 154(b) by 0 days.

(21) Appl. No.: 09/866,856

(22) Filed: May 29, 2001

(65) Prior Publication Data

US 2002/0134763 A1 Sep. 26, 2002

(30) Foreign Application Priority Data

Mar. 25, 2001 (DE) .......................................... 101 14 323

(51) Int. Cl.[7] ................................................ B23K 11/24
(52) U.S. Cl. ..................................... 219/108; 219/86.25
(58) Field of Search ................................ 219/108, 110, 219/86.41, 86.25; 363/71

(56) References Cited

U.S. PATENT DOCUMENTS 5,945,011 A * 8/1999 Takano et al. ............... 219/108
6,326,580 B1 * 12/2001 Hiiro .......................... 219/110

* cited by examiner

Primary Examiner—Clifford C. Shaw
(74) Attorney, Agent, or Firm—Choate, Hall & Stewart

(57) ABSTRACT

Apparatus for resistance welding with different welding currents has a welding transformer having a primary and a secondary side. Two welding electrodes are connected at the secondary side to the welding transformer and are each arranged on a respective control arm, one of the arms being movable by an actuating drive. A control and regulating arrangement is connected on the primary side between the welding transformer and a connection to a three-phase network. The control and regulating arrangement has a rectifier circuit connected to all three phases of the network and a controllable welding inverter for converting the rectified voltage into voltage pulses of alternating polarity at a predetermined frequency. At least one electronic component of the rectifier circuit and/or the welding inverter is connected to the drive for moving one of the control arms, for controlling and/or powering the drive.

29 Claims, 2 Drawing Sheets

APPARATUS FOR RESISTANCE WELDING

FIELD OF THE INVENTION

The invention generally concerns an apparatus for resistance welding and more particularly an apparatus for resistance welding with different welding currents.

BACKGROUND OF THE INVENTION

A typical form of apparatus for resistance welding includes a welding transformer with a primary side and a secondary side. Arranged on the secondary side are two welding electrodes which are connected to the welding transformer. The welding electrodes are also each arranged on a respective operating or positioning arm, of which at least one is movable by way of an actuator drive. Also arranged at the primary side is a regulating arrangement with electronically controllable switching members disposed between the welding transformer and the connection to a three-phase mains network. The regulating arrangement serves to regulate the voltage at the primary side.

Such an apparatus is intended for a resistance welding procedure in which the welding electrodes are pressed with a certain contact pressure force against both sides of the articles to be welded, for a certain period of time. For example plates or sheets can be welded together with that apparatus.

Conventional arrangements for producing a welding current in the case of ac resistance welding apparatuses are well known from the state of the art. In one such arrangement a voltage is tapped off between two connections of the three-phase network and fed to the welding transformer. Provided on the primary side of the welding transformer are two thyristors which are arranged parallel to each other with opposite forward directions and which form electronic switching members. The two connections can be connected to two phases of the three-phase network or to the neutral conductor and a phase of the network which usually involves a network frequency of 50 Hz or 60 Hz.

The above-discussed arrangement with the thyristors is inexpensive and generally reliable in operation. It will be noted however that the regulating options afforded with that arrangement are limited as the thyristors are switched only once in each half-wave of the current on the primary side and are switched off only at the zero-passage of the current on the primary side. Such an arrangement also suffers from further disadvantages which are generally known in this context and which therefore do not need to be further discussed herein.

The disadvantages of the above-discussed arrangement can be avoided by a resistance welding apparatus which has been offered in the past by the present patentees and which is operable to convert alternating current into direct current. That apparatus comprises a rectifier with a B-6 circuit, that is to say a bridge circuit with six diodes, with an inverting converter, also referred to as inverter, connected on the output side. The apparatus also has a smoothing capacitor. The voltage of all three phases, which is tapped off from the three-phase network, is rectified by the rectifier and chopped and inverted by the inverter. Depending on the capacity and operational efficiency of the inverter it generates a series of rectangular pulses of alternate polarity in the medium-frequency range, which can be referred to for the sake of brevity as the MF-range, at for example 1000 Hz, or in the high-frequency range, which can be referred to for the sake of brevity as the HF-range, at for example 20,000 Hz. In those apparatuses that voltage is applied to the primary side of an MF-transformer or HF-transformer designed for the corresponding frequency. The medium-frequency or high-frequency transformer voltage is rectified on the secondary side by high-current diodes and fed to the welding electrodes. The mode of operation of that apparatus is generally known and therefore does not need to be further discussed herein.

The essential parameters in regard to resistance welding are on the one hand the welding current and on the other hand the welding time for which the welding current flows. In the above-discussed apparatuses both parameters are controlled by a welding control system. A further parameter however which also has a crucial influence on resistance welding is the contact pressure force which has already been referred to hereinbefore. Hereinafter in this specification the contact pressure force will be referred to generally as the welding force.

In the above-discussed prior apparatuses the welding force is afforded for example by a pneumatic or hydraulic actuating drive for moving one of the control arms on which one of the welding electrodes is arranged, while the other control arm with the other welding electrode is arranged fixedly and rigidly. Instead of the pneumatic or hydraulic drive however it is also possible for the control arm to be moved by means of an electric motor. In comparison with the pneumatic or hydraulic drives, an electric motor drive is faster, more precise and can be better controlled. Furthermore, the wear of the individual components which make up the welding tongs assembly formed by the control arms and the welding electrodes, and in particular the wear suffered by the welding electrodes, is less by virtue of the controllable movement and the force settings which can be achieved in that case.

The electric motor in the above-discussed prior apparatuses is controlled by a drive control system which is provided exclusively for controlling the electric motor. In that case, the drive control system co-operates with the welding control system in such a way that matching of the above-indicated parameters in order to achieve a good welding result is possible only at the cost of a relatively high level of complication. In addition, the two separate control systems, more specifically the drive control system and the welding control system, means that the costs in terms of material for producing the apparatuses in question are also high.

SUMMARY OF THE INVENTION

An object of the present invention is to provide an apparatus for resistance welding by means of frequency inverter technology in which the drive control system for the drive is simplified so that the apparatus production costs are reduced.

Another object of the present invention is to provide an apparatus for resistance welding which is of a simplified structure generally and also in terms of its operating systems while nonetheless affording reliable operational results.

Still another object of the present invention is to provide a resistance welding apparatus capable of implementing welding procedures using different welding currents, which affords enhanced versatility of operation without the requirement for complicated operating and control systems.

Yet another object of the present invention is to provide a resistance welding apparatus which is so designed that components which are present in the apparatus can be used for more than just one operational purpose.

In accordance with the principles of the present invention the foregoing and other objects are attained by an apparatus for resistance welding, with different welding currents, comprising a welding transformer having a primary side and a secondary side, and first and second welding electrodes which are connected at the secondary side to the welding transformer and which are each arranged on a respective control or positioning arm. The apparatus has at least one drive for moving at least one of the control arms. A regulating and control arrangement which is connected on the primary side between the welding transformer and a connection to a three-phase network comprises a rectifier circuit connected to all three phases of the three-phase network and a controllable welding inverter which converts the rectified voltage into voltage pulses of alternating polarity at a predetermined frequency. At least one electronic unit of the rectifier circuit and/or the welding inverter is connected to the drive for controlling and/or powering the drive.

The at least one drive for moving at least one of the control arms may be more particularly an electric motor, and the movement of the control arms may be either a direct movement of the control arm or an indirect movement by means of an intermediate member. The controllable welding inverter converts the rectified voltage into voltage pulses of alternating polarity at a predetermined frequency of for example between 1000 Hz and 20,000 Hz.

It will be seen from the description hereinafter of preferred embodiments of the invention that the apparatus of the invention enjoys the advantage that it saves on a control unit, more specifically the separate drive control system of the above-discussed prior apparatuses, thus affording a reduction in the amount of material required to produce the apparatus and thus a reduction in the manufacturing costs generally. Electronic components which are required for producing and controlling the welding current and which are thus already provided in the apparatus are in part or completely also used for controlling and powering the drive. That affords a saving on important, major and expensive electronic components, in comparison with the prior apparatuses.

In accordance with a preferred feature of the invention at least one electronic component of the welding inverter is connected between the rectifier circuit and the drive. It is of particular advantage for the welding inverter per se, that is to say the entire welding inverter, to be connected between the rectifier circuit and the drive. The welding inverter which is then used jointly by the welding transformer and the drive in that case converts the rectified voltage both for the drive and also for the welding transformer.

In a further preferred feature of the invention not just individual electronic components of the rectifier circuit are connected to the drive, but the rectifier circuit per se is connected to the drive. That design configuration is suitable for a drive which is operated with dc voltage. If in contrast the apparatus uses a drive which requires ac voltage, then the welding inverter is preferably connected between the rectifier circuit and the drive in order to convert the rectified voltage into an ac voltage again. As an alternative thereto, it is possible to use two different inverters. In that case, on the one hand the above-specified welding inverter is connected between the rectifier circuit and the welding transformer, while on the other hand a further inverter, which can be referred to hereinafter generally as the drive inverter, is connected between the rectifier circuit and the drive. That can be particularly advantageous as, in terms of the electronic components of the drive inverter, it is possible to have recourse to using less expensive units than those of the welding inverter which, by virtue of being required to generate the high welding current, have to meet particular demands in that respect.

Preferably the apparatus has a welding current control arrangement for controlling the welding process. That not only communicates control and reference or target values to the individual units of the apparatus, but it also receives from such units data that it requires for controlling the welding procedure. The welding current control arrangement makes it possible to accurately set and monitor the welding current as well the welding time in order in that way to ensure a good weld for two electrically conductive items.

In a further preferred feature of the invention the welding inverter may be arranged between the welding current control arrangement and the welding transformer.

A further preferred feature of the invention also provides that the welding current control arrangement is connected to the drive. In that case the drive is controlled by the welding current control arrangement so that the welding force and/or the welding electrode position can also be adjusted and monitored by means of the welding current control arrangement. In that respect, especially as the welding current control arrangement has a comprehensive control function, it can also be referred to generally as the welding control. This design configuration permits the three welding parameters listed hereinbefore to be accurately and well matched to each other.

In a further preferred feature of the invention the welding inverter is connected between the welding control and the drive. As an alternative thereto a further separate drive inverter may be connected on the input side of the drive, to connect the drive to the welding control.

Preferably, the one control arm is arranged fixedly and rigidly while the other control arm is arranged to be movable by means of the drive. Additionally or alternatively both control arms may be arranged on a movable actuating or control member. That actuating member is connected to a drive and can be moved thereby. That drive can be supplied with voltage for example by a voltage supply unit which is independent of the above-mentioned three-phase network. As an alternative thereto, the drive may be supplied with voltage from the three-phase network. For that purpose the drive for moving the actuating member is connected to at least one electronic unit of the rectifier circuit and/or the welding inverter. That drive also shares with the welding transformer the welding inverter which is associated therewith. Instead of the welding inverter, a further separate drive inverter may also be connected on the input side of the drive for moving the actuating member. The drive for moving the actuating member may be in the form of an electric motor but alternatively it may also be in the form of a pneumatic or hydraulic drive.

In a further preferred feature of the invention the drive for moving the actuating or control member is connected to the welding control.

The above-mentioned inverters according to the invention preferably have a bridge circuit with transistors as switching members and free-wheeling diodes parallel thereto. Preferably the apparatus uses IGBTs (insulated gate bipolar transistors) in which the free-wheeling diode is integrated with a transistor acting as a switching member in one component.

Preferably, the inverters are arranged on a common component carrier or support, for examples mounting unit or a cooling plate. That can ensure that the number of components required for the inverters, for example feed lines, cooling system and so forth, remains low as those components can be jointly used for a plurality of functions.

Further objects, features and advantages of the invention will be apparent from the description hereinafter of preferred embodiments thereof.

DESCRIPTION OF PREFERRED EMBODIMENTS

Figure 1:
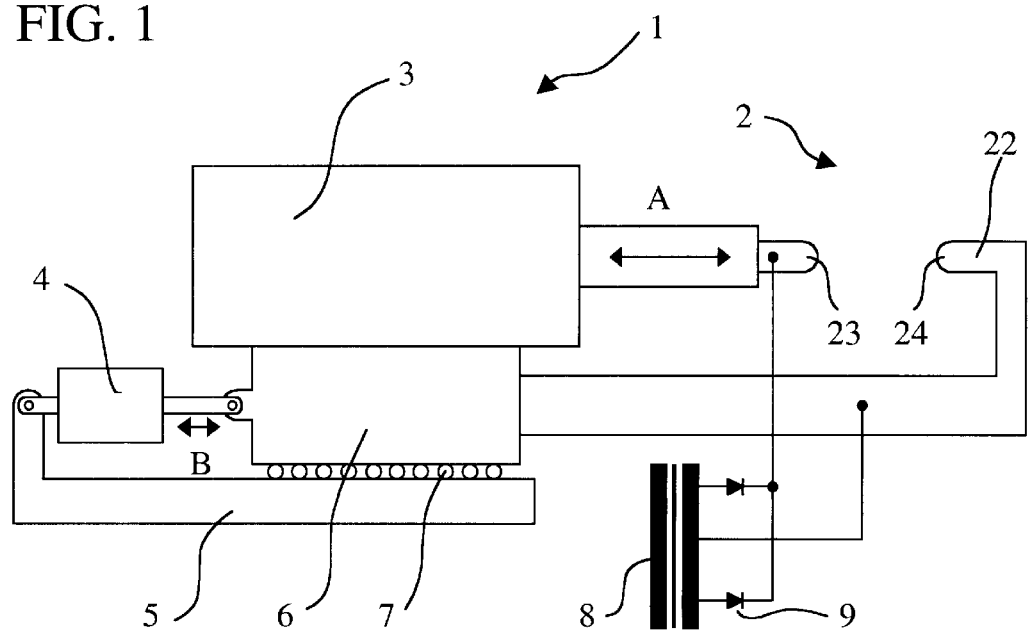
FIG. 1 shows a welding apparatus according to the invention with a generally C-shaped electrode tongs assembly.

Referring firstly to FIG. 1, shown therein is a first embodiment of a welding apparatus 1 according to the invention. One of the important components of the welding apparatus 1 is an electrode tongs assembly indicated overall by reference numeral 2 which is of a generally C-shaped configuration, or U-shaped, depending on the respective direction of view thereon. The electrode tongs assembly 2 has two control or positioning tongs arms 21, 22 at the free ends of each of which is arranged a respective electrode diagrammatically indicated at 23 and 24.

The arm 21 is movable in the direction indicated by the arrow A by means of a drive 3 arranged on the arm 21, in the form of an electric motor. In that way the electrode tongs assembly 2 can be appropriately opened or closed. In contrast, the arm 22 of the electrode tongs assembly 2 is arranged rigidly on a housing 6 on which the actuating drive 3 is also carried. The housing 6 is supported movably by way of a linear guide 7 on a base plate 5. The movement of the housing 6 is in the direction indicated by the arrow B and is produced by an actuating drive 4 connected to the housing 6 by way of a suitable connecting arrangement. The drive 4 is also in the form of an electric motor.

The welding apparatus 1 also has a welding transformer diagrammatically indicated at 8, on the primary side of which is arranged a regulating or control and supply circuit. This will be described in greater detail hereinafter. As can be clearly seen from FIG. 1 the two electrodes 23 and 24 are connected to the secondary side of the welding transformer 8. The illustrated embodiment of the welding transformer 8 is an MF-welding transformer with a central tapping at the coil on the secondary side. Two high-current diodes 9 are used for rectifying the voltage resulting from the two end tapping points of the welding transformer 8.

The above-described welding apparatus 1 is used in particular in an automated operating procedure. For that purpose the welding apparatus 1 can be mounted on a robot which is used for movement of the welding apparatus 1 in space.

If now two items, for example two metal sheets or plates, are to be welded together with the above-described welding apparatus 1, the welding apparatus 1 is moved by the robot carrying it into a starting position at which the two items to be welded together are held. As the welding apparatus 1 however is used not just at one starting position but at many different starting positions in space, at which there are various items to be welded, it is often necessary, after the welding apparatus 1 has been moved into its starting position, for that position to be further slightly corrected so that the items can also be welded to each other in the desired plane. The drive 4 is more particularly provided to achieve that fine adjustment of the starting position of the welding apparatus. After the welding apparatus 1 has reached its starting position therefore the electrode tongs assembly 2 is moved in the direction indicated by the arrow B, by suitable actuation of the drive 4, until the electrode tongs assembly 2 is in the proper optimum position for the welding operation. Additionally or alternatively the actuating drive 4 can also serve to adjust for or compensate for the falsifying influence of the weight of the electrode tongs assembly 2 on the welding force, thereby to achieve a floating support action for the electrode tongs assembly 2. It will be appreciated that the weight of the electrode tongs assembly 2 can act in different ways, depending on the respective position in space of the arrangement.

The drive 3 of the movable arm 21 is then actuated to move the arm 21 in the direction indicated by the arrow A in such a way that the electrode 23 bears against the one item to be welded and the electrode 24 bears against the other item. The drive 3 can be operated in such a way as to adjust the welding force which, in conjunction with the welding current and the welding time, influences welding of the two items to each other.

Figure 2:
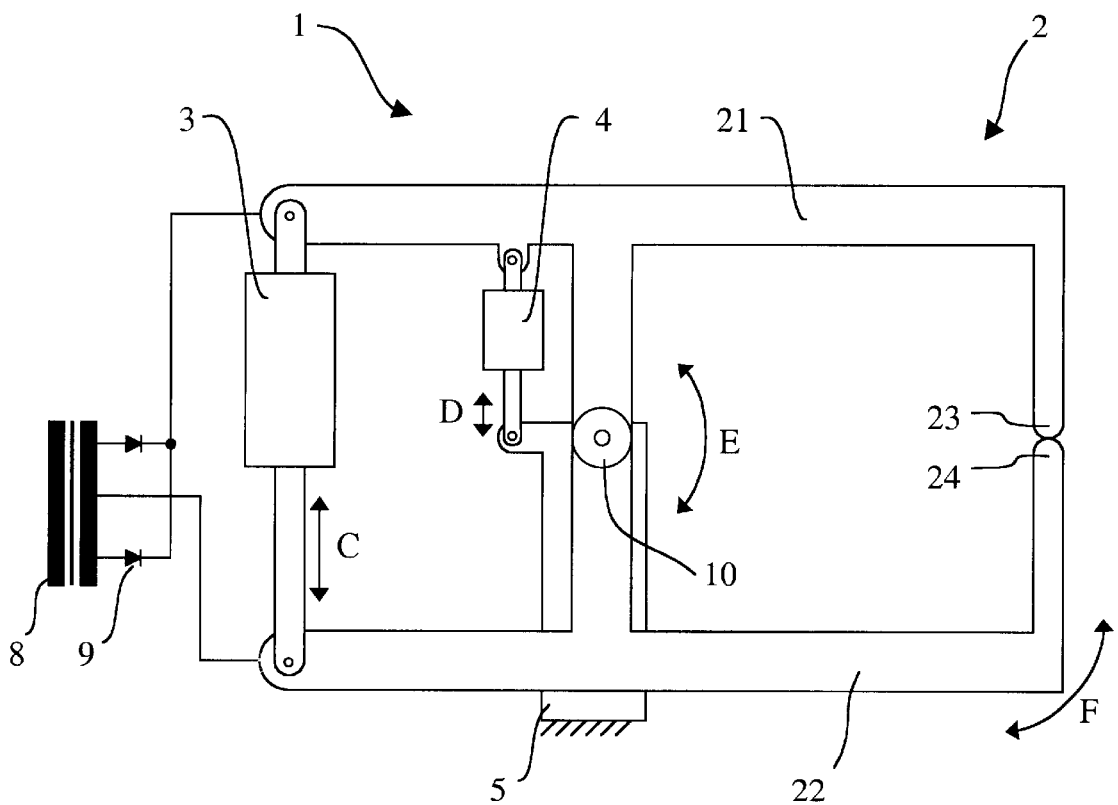
FIG. 2 shows a welding apparatus according to the invention with an X-shaped electrode tongs assembly.

Reference will now be made to FIG. 2 showing a further embodiment of the welding apparatus 1 according to the invention. In the description hereinafter in relation to FIG. 2, the same components as those used in the structure of FIG. 1 will be denoted by the same references as those employed in FIG. 1.

The welding apparatus 1 of FIG. 2 has a generally X-shaped electrode tongs assembly 2 which is pivotable about a pivot 10 arranged on a base plate 5, in directions indicated by arrows E and F respectively. The electrode tongs assembly 2 has two tongs arms 21 and 22, at the free ends of each of which is arranged a respective electrode 23, 24. An actuating drive 4 in the form of an electric motor is arranged on the base plate 5 and on the arm 21, by way of pivot connections. The electrode tongs assembly 2 is pivotable in the directions indicated by the arrows E and F about the pivot 10 by means of the drive 4.

Arranged at further ends of the arms 21, 22 by way of a further connection is a further drive which is generally indicated at 3 and which is also shown in the form of an electric motor. The drive 3 is operable to move the movable arm 22 while in this embodiment the arm 21 is a stationary or fixed arm.

The FIG. 2 embodiment of the apparatus according to the invention also has an MF-welding transformer 8 with high-current diodes 9 connected on the output side thereof. The secondary side of the welding transformer 8 is connected to the electrodes 23 and 24 in the manner already described above with reference to FIG. 1.

The mode of operation of the embodiment shown in FIG. 2 is almost identical to that shown in FIG. 1. The drive 4 also serves to compensate for any displacement which may occur in respect of the welding plane, by virtue of a previously set automated coarse adjustment in respect of the position of the electrode tongs assembly 2 in space. The drive 4 is also used for weight-compensation purposes, as also described above with reference to FIG. 1. The drive 3 in contrast serves for opening and closing the electrode tongs assembly 2 by suitably moving the movable arm 22. The drive 3 also serves for setting the welding force applied to the two items to be welded together.

Figure 3:
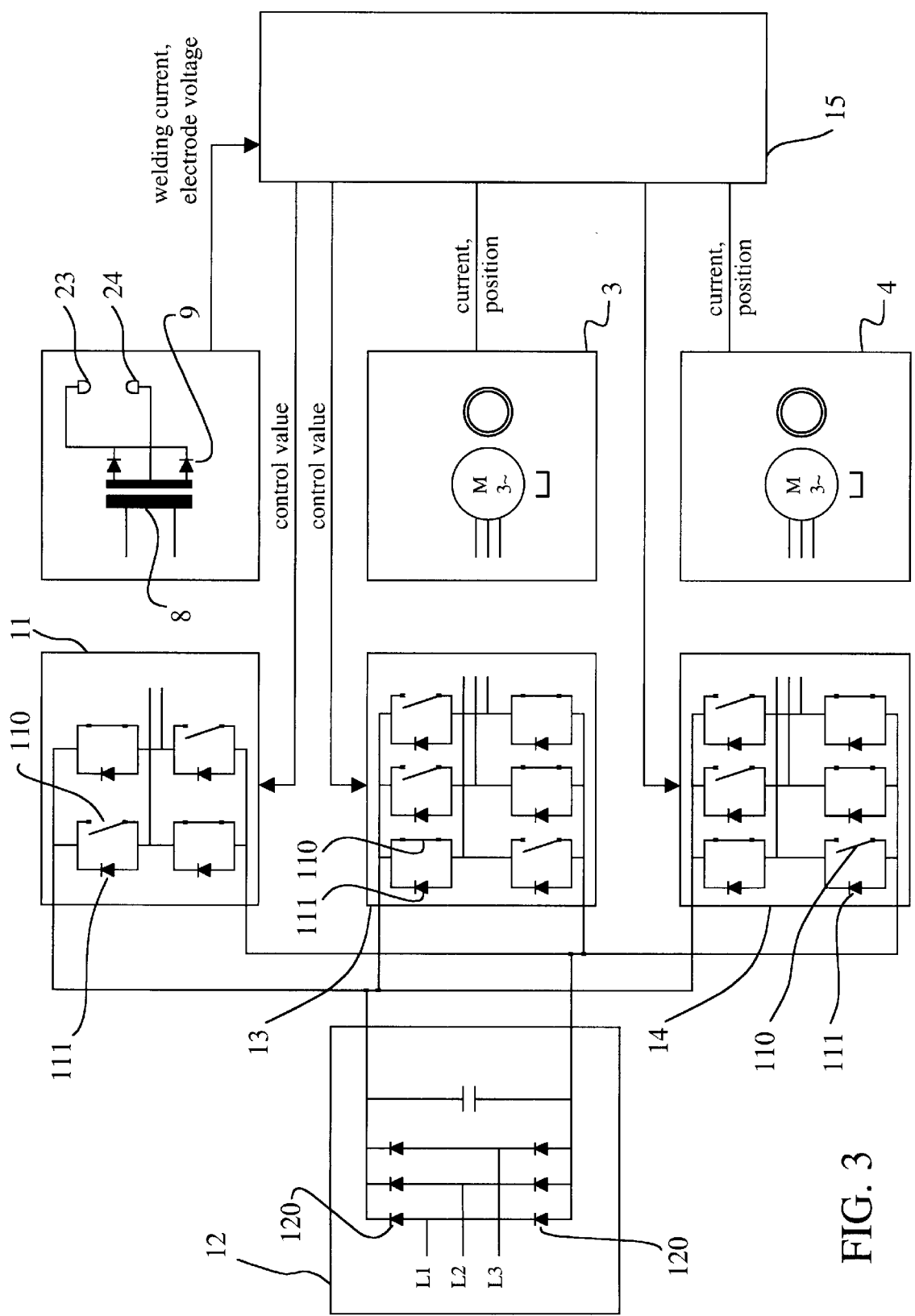
FIG. 3 shows a diagrammatic view of a control and voltage supply arrangement for the two welding apparatuses.

Attention will now be directed to FIG. 3 which is a diagrammatic view of a control and voltage supply unit which is connected on the input sides of the drives 3, 4 and the welding transformer 8.

In this embodiment welding current regulation on the primary side is implemented by rectification of the voltage of a three-phase mains network by means of a rectifier 12 which has a circuit referred to as a B-6 circuit, that is to say a bridge circuit with six diodes indicated at 120. The arrangement further includes a smoothing capacitor for smoothing the rectified voltage. Connected on the output side of the rectifier 12 is a welding inverter which is generally indicated by reference numeral 11 and which is connected to the welding transformer 8 and supplies it on the primary side with voltage. The welding inverter 11 has four electronically actuable switches diagrammatically indicated at 110 which are each connected in parallel with a respective free-wheeling diode 111. The switches 110 used here are preferably in the form of transistors which are each combined with a respective free-wheeling diode 111 in a single component, forming an IGBT.

In the embodiment illustrated in FIG. 3 the welding inverter 11 generates a series of rectangular pulses of alternate polarity in the MF-range. As an alternative thereto it can generate pulses in the high-frequency range. That voltage is fed to the primary side of the welding transformer 8, rectified on the secondary side thereof by the diodes 9 and fed to the welding electrodes 23, 24.

The welding current is determined by the welding inverter 11. With a constant frequency in respect of the welding inverter 11, the pulse duty factor, being the ratio of the switch-on duration during a voltage pulse, is varied. That controls the level of the welding current on the secondary side. For the purposes of setting the welding current the welding inverter 11 receives a reference or target value which is needed for welding two items, by way of the welding control 15 which may be for example a microprocessor. The desired level of the welding current is suitably set by setting the appropriate pulse duty factor.

The welding time is also controlled by means of the welding control 15, that is to say the time for which the welding operation lasts and the time for which welding current is made available. The welding control 15 receives from the welding transformer 8 by way of a data line the values of the available welding current and the electrode voltage which it requires for accurate control of the welding procedure.

The welding force is afforded by means of the actuating drive 3 which moves the movable arm of the electrode tongs assembly 2 and thus determines the contact pressure with which the electrodes 23, 24 of the electrode tongs assembly 2 are pressed against the two items to be welded. The drive 3 is also supplied with voltage from the rectifier 12, while connected between the drive 3 and the rectifier 12 is a drive inverter which is generally indicated by reference 13 and which converts the rectified voltage from the rectifier 12 into a voltage required for the drive 3. For that purpose it has six electronically actuable switches 110 which are connected in parallel with a respective free-wheeling diode 111. IGBTs are preferably also used here.

A control value is predetermined for the drive inverter 13 by means of the welding control 15, so that the tongs arm is moved by means of the drive 3 to a given position which corresponds to the reference or target value thereof. That position also corresponds to a given welding force for, the more the tongs arm is moved towards and pressed against the one item to be welded, the correspondingly greater is the welding force. In order to permit precise control, the drive 3 at regular intervals supplies the welding control 15 with information about its position and the motor current, in which respect additionally or alternatively thereto the motor current provides information for ascertaining the welding force.

The above-described compensating procedure for fine adjustment of the welding plane or the weight-compensation procedure is effected by means of the drive 4 which also has a drive inverter 14 connected on the input side thereof. The latter also has six electronically actuable switches 110 connected in parallel with a respective free-wheeling diode 111. In this case also IGBTs are used. The drive inverter 14 is connected to the rectifier 12 and serves in the same manner for the voltage supply to the drive 4 as the drive inverter 13 serves for the voltage supply for the drive 3. The drive 4 is also controlled by means of the welding control 15 in the same manner as the drive 3. For that purpose the welding control 15 is supplied with information in regard to the motor current, position and/or weight compensation.

As an alternative to the embodiment described with reference to FIG. 3 it is possible for the drive 4 to be supplied with voltage by means of an external voltage source.

In the embodiment illustrated in FIG. 3 all IGBTs may be mounted for example on a single circuit board which at the same time is in the form of a cooling plate. That has the advantage that the number of components required for the inverters, for example feed lines, cooling system and so forth, is still low as those components can be used jointly for a plurality of functions.

It will be seen from the foregoing description that the present invention enjoys the advantage that it saves on the provision of a control unit, namely a separate drive control system, so that the material required for manufacturing the apparatus and therewith the manufacturing costs thereof can be reduced. It will be noted that electronic components which are required for producing and controlling the welding current and which are already present in the apparatus are in part or completely also used for controlling and powering the drive. That in turn constitutes a saving in terms of important and therefore expensive electronic components.

It is further possible with the apparatus according to the invention to react rapidly to changes in the welding procedure and to individually match the three parameters referred to above, namely welding current, welding time and welding force, in real time during each individual welding operation, more specifically by way of a common control unit constituted by the welding control. That permits adequate and good welding of items in a properly controlled fashion.

It will be appreciated that the above-described apparatuses in accordance with the invention have been set forth solely by way of example and illustration thereof and that various other modifications may be made therein without thereby departing from the spirit and scope of the invention.

What is claimed is:

1. Apparatus for resistance welding with different welding currents comprising a welding transformer having a primary side and a secondary side, first and second welding electrodes, first connecting means connecting the first and second welding electrodes to the welding transformer on the secondary side, first and second control arms each carrying a respective welding electrode, at least one drive for moving at least one of the control arms, a control and regulating arrangement connected on the primary side of the welding transformer between the welding transformer and a connection for a three-phase network, the control and regulating arrangement including a rectifier circuit adapted to be connected to all three phases of the three-phase network and a controllable welding inverter operable to convert the rectified voltage into voltage pulses of alternating polarity at a predetermined frequency, at least one electronic switching unit in at least one of the rectifier circuit and the welding inverter, and second connecting means connecting said at least one electronic switching unit to said drive for operational functioning thereof.

2. Apparatus as set forth in claim 1 wherein said second connecting means connect the entire rectifier circuit to said drive.

3. Apparatus as set forth in claim 2 including connecting means connecting at least one electronic switching unit of the welding inverter between the rectifier circuit and the drive.

4. Apparatus as set forth in claim 2 including connecting means connecting the entire welding inverter between the rectifier circuit and the drive.

5. Apparatus as set forth in claim 2 wherein the welding inverter is connected between the rectifier circuit and the welding transformer, and further including a drive inverter between the rectifier circuit and the drive.

6. Apparatus as set forth in claim 5 wherein the drive inverter has a bridge circuit with transistors as switching members and free-wheeling diodes parallel thereto.

7. Apparatus as set forth in claim 5 wherein said drive inverter is arranged on a single carrier.

8. Apparatus as set forth in claim 1 and including a welding control means for controlling a welding procedure.

9. Apparatus as set forth in claim 8 including connecting means connecting the welding inverter between the welding control means and the welding transformer.

10. Apparatus as set forth in claim 8 including connecting means connecting the welding control means to the drive.

11. Apparatus as set forth in claim 10 including connecting means connecting the welding inverter between the welding control means and the drive.

12. Apparatus as set forth in claim 10 including connecting means connecting the drive inverter between the welding control means and the drive.

13. Apparatus as set forth in claim 1 including means rigidly mounting the first control arm, and operating means connecting the second control arm to the drive for movement of the control arm by means of the drive.

14. Apparatus as set forth in claim 1 wherein the welding inverter has a bridge circuit with transistors as switching members and free-wheeling diodes parallel thereto.

15. Apparatus as set forth in claim 1 wherein said welding inverter is arranged on a single carrier.

16. Apparatus for resistance welding with different welding currents, comprising:

a welding transformer having a primary side and a secondary side, first and second welding electrodes, first connecting means connecting the first and second welding electrodes to the welding transformer on the secondary side, first and second control arms each carrying a respective welding electrode, at least one drive for moving at least one of the control arms, a control and regulating arrangement connected on the primary side of the welding transformer between the welding transformer and a connection for a three-phase network, the control and regulating arrangement including a rectifier circuit adapted to be connected to all three phases of the three-phase network and a controllable welding inverter operable to convert the rectified voltage into voltage pulses of alternating polarity at a predetermined frequency, at least one switching electronic unit in at least one of the rectifier circuit and the welding inverter, second connecting means connecting said at least one electronic switching unit to said drive for operational functioning thereof, a movable control member on which the first and second control arms are arranged, and a second drive adapted to move the control member.

17. Apparatus as set forth in claim 16 wherein said second drive is an electric motor.

18. Apparatus as set forth in claim 16 wherein said second drive is a pneumatic drive.

19. Apparatus as set forth in claim 16 wherein said second drive is a hydraulic drive.

20. Apparatus as set forth in claim 16 and further including a voltage supply unit which does not correspond to the three-phase network, and means connecting the second drive for moving the control member to said voltage supply unit.

21. Apparatus as set forth in claim 16 and further including means connecting the second drive for moving the control member to at least one electronic switching unit of the rectifier circuit.

22. Apparatus as set forth in claim 21 wherein the welding inverter is connected between the rectifier circuit and the welding transformer, and further including a drive inverter connected between the rectifier circuit and said second drive.

23. Apparatus as set forth in claim 22 wherein the drive inverter has a bridge circuit with transistors as switching members and free-wheeling diodes parallel thereto.

24. Apparatus as set forth in claim 22 wherein said drive inverter is arranged on a single carrier.

25. Apparatus as set forth in claim 16 and further including means connecting the second drive for moving the control member to at least one electronic switching unit of the welding inverter.

26. Apparatus as set forth in claim 25 wherein the welding inverter is connected between the rectifier circuit and the welding transformer, and further including a drive inverter connected between the rectifier circuit and said second drive.

27. Apparatus as set forth in claim 26 wherein the drive inverter has a bridge circuit with transistors as switching members and free-wheeling diodes parallel thereto.

28. Apparatus as set forth in claim 26 wherein said drive inverter is arranged on a single carrier.

29. Apparatus as set forth in claim 16 and further including
a welding control means for controlling the welding process
wherein the second drive is connected to the welding control means.

* * * * *